(12) United States Patent
Muramatsu

(10) Patent No.: US 7,864,237 B2
(45) Date of Patent: Jan. 4, 2011

(54) SOLID-STATE IMAGING DEVICE, METHOD OF DRIVING SOLID-STATE IMAGING DEVICE, AND CAMERA

(75) Inventor: Yoshinori Muramatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 372 days.

(21) Appl. No.: 11/679,544

(22) Filed: Feb. 27, 2007

(65) Prior Publication Data

US 2008/0117321 A1  May 22, 2008

(30) Foreign Application Priority Data

Mar. 6, 2006 (JP) .......................... P2006-059022

(51) Int. Cl.
*H04N 3/14* (2006.01)
*H04N 5/335* (2006.01)

(52) U.S. Cl. .................. 348/302; 348/294; 348/296; 348/304; 250/208.1

(58) Field of Classification Search ......... 348/294–310; 250/208.1
See application file for complete search history.

(56) References Cited

U.S. PATENT DOCUMENTS

| 5,841,126 A | * | 11/1998 | Fossum et al. ............ 250/208.1 |
| 6,563,540 B2 | * | 5/2003 | Trevino et al. ............... 348/302 |
| 6,933,972 B2 | * | 8/2005 | Suzuki et al. ................ 348/302 |
| 2008/0151088 A1 | * | 6/2008 | Frey et al. ................... 348/308 |

FOREIGN PATENT DOCUMENTS

| JP | 2001-223350 | | 8/2001 |
| JP | 2002-027331 | A | 1/2002 |
| JP | 2002-232291 | A | 8/2002 |
| JP | 2003-163844 | A | 6/2003 |
| JP | 2003-224776 | A | 8/2003 |
| JP | 2004-020325 | | 1/2004 |
| JP | 2004-274578 | | 9/2004 |
| JP | 2006-033452 | | 2/2006 |
| WO | WO 2005/111978 | * | 11/2005 |

OTHER PUBLICATIONS

Japanese Patent Office, Office Action issued in Patent Application JP 2006-059022, on Nov. 10, 2009.
Japanese Office Action issued Mar. 2, 2010 in connection with corresponding counterpart JP Application No. 2006-059022.
Japanese Patent Office Action corresponding to Japanese Serial No. 2006-059022 dated Jun. 1, 2010.

* cited by examiner

*Primary Examiner*—Sinh Tran
*Assistant Examiner*—Anthony J Daniels
(74) *Attorney, Agent, or Firm*—SNR Denton US LLP

(57) ABSTRACT

A solid-state imaging device includes: a plurality of pixels each converting the amount of incident light into an electric signal and disposed in a plurality of columns to be deviated from the neighboring pixels in a row direction or in a column direction; a plurality of analog-to-digital converting units each converting an analog signal obtained from a corresponding pixel into a digital signal and disposed along a column in parallel; a plurality of column signal lines outputting the analog signals of the pixels of each of the plurality of pixel columns, disposed along the pixel columns, and making pairs; and a plurality of switching circuit units each selecting one column signal line of a corresponding pair of column signal lines. In the solid-state imaging device, the analog-to-digital converting units are connected to the output sides of the switching circuit units.

7 Claims, 11 Drawing Sheets

Related Art

SOLID-STATE IMAGING DEVICE, METHOD OF DRIVING SOLID-STATE IMAGING DEVICE, AND CAMERA

CROSS REFERENCES TO RELATED APPLICATIONS

The present invention contains subject matter related to Japanese Patent Application JP 2006-059022 filed in the Japanese Patent Office on Mar. 6, 2006, the entire contents of which being incorporated herein by reference.

BACKGROUND OF INVENTION

1. Field of the Invention

The present invention relates to a solid-state imaging device, a method of driving the solid-state imaging device, and a camera.

2. Description of the Related Art

Methods of arranging a plurality of A/D converting units in a MOS-type solid-state imaging device, which includes a plurality of photoelectric conversion elements arranged to be staggered and the plurality of A/D converting units, have been disclosed (see, for example, JP-A-2001-223350).

A MOS-type solid-state imaging device according to a first example of the related art will be described with reference to a block diagram of FIG. 10.

As shown in FIG. 10, in a MOS-type solid-state imaging device 100, a plurality of photoelectric conversion elements 110 each composed of a photodiode are disposed on one surface of a semiconductor substrate 101 such that each photoelectric conversion element deviates from adjacent photoelectric conversion elements in a row direction or a column direction, that is, the photoelectric conversion elements are arranged to be staggered. A plurality of output signal lines 130 are disposed to correspond one-to-one with the photoelectric conversion element columns 111. Each of the output signal lines 130 extends on the left side of the corresponding photoelectric conversion element column 111 along the corresponding photoelectric conversion element column 111 as shown in FIG. 10. Each output signal line 130 is electrically connected to the photoelectric conversion elements 110 in the corresponding photoelectric conversion element column 111 through switching circuit units. An output transistor included in each switching circuit unit can generate an electric detection signal according to the amount of signal charge stored in a corresponding photoelectric conversion element 110 on a corresponding output signal line 130.

A plurality of A/D converting units 140 each are provided on the semiconductor substrate 101 for every two output signal lines 130. Each of the A/D converting units 140 is electrically connected to two corresponding output signal lines 130. Also, each of the A/D converting units 140 is configured to have an A/D converter 145. For example, a plurality of sampling/holding circuit units 141 each are disposed between each A/D converter 145 and two output signal lines 130 corresponding to the A/D converter 145. Each of the A/D converters 145 sequentially generates and outputs digital signals corresponding to the electric detection signals generated on the two corresponding signal lines 130. Since the plurality of photoelectric conversion elements 110 are arranged to be staggered, the electric detection signal is not simultaneously generated on two output signal lines 130 corresponding to one A/D converting unit 140. The electric detection signal is generated on only one of the two output signal lines 130 corresponding to one A/D converting unit 140.

FIG. 11 is a block diagram for explaining a second example of the related art.

As shown in FIG. 11, the basic configuration and operation of a MOS-type solid-state imaging device 200 according to the second example of the related art are the same as those in the first example of the related art. However, in the second example, a plurality of output signal lines 130 each are disposed to meander through corresponding photoelectric conversion element columns 110 in plan view. Therefore, it is possible to reduce the number of output signal lines 130 to half that in the first example.

In the MOS-type solid-state imaging device according to any one of the first and second examples of the related art, a plurality of photoelectric conversion elements 110 are disposed to be staggered. When the above-mentioned configuration is taken, that is, when the plurality of photoelectric conversion elements 110 are arranged to be staggered, one photoelectric conversion element row includes either the photoelectric conversion elements 110 in the even-numbered columns or the photoelectric conversion elements 110 in the odd-numbered columns. Therefore, by providing one A/D converting unit 140 for every two photoelectric conversion element columns 111, each A/D converting unit can separately receive electric signals generated by corresponding output transistors and generate digital signals corresponding to the received electric signals. In this case, as described concerning the first and second examples, it is possible to reduce the total number of A/D converting units 140 to half the total number of photoelectric conversion elements 111. That is, it is possible to reduce the total number of A/D converting units 140 by half in the related art. As a result, even when the integration degree of the photoelectric conversion elements is made high, it is possible to form the A/D converting units 140 without using a highly sophisticated microfabrication technique. Accordingly, it is possible to reduce the manufacturing cost.

However, in the examples, the total number of A/D converting units 140 has been made to half the total number of photoelectric conversion element columns 111. Therefore, in the first example, since the column signal lines 130 are connected two-by-two to each A/D converting unit 140, the total length of the column signal lines 130 connected to one A/D converting unit 140 becomes two times larger than that in the related art. In the second example, since the column signal lines 130 each meander through two photoelectric conversion element columns, the length of the column signal line 130 connected to one A/D converting unit 140 becomes two times larger than that in the related art, or the number of photoelectric conversion elements 110 on one column signal line 130 becomes two times larger than that in the related art. As a result, the time it takes to read signals of the photoelectric conversion elements 110 to the column signal lines 130 becomes longer due to the load capacity of the wiring lines or the elements.

In particular, in a CMOS image sensor, generally, an amplifier is provided in a pixel. The amplifier performs amplifying and reading. An amplifying unit of the amplifier performs source-follower reading. In a source-drain reading mode, since amplifying is performed by disposing a current source upside or downside of a column signal line and applying a current to an amplifying transistor of a pixel, when the load capacitor of the amplifying transistor increases, the read time becomes longer.

SUMMARY OF THE INVENTION

In the examples, since the length of the column signal line connected to each A/D converting unit is about two times larger than that in the related art, the wiring capacity or the pixel capacity becomes two times larger than that in the related art. Therefore, the amount of time it takes for signals of the photoelectric conversion elements to reach the column signal lines increases. As a result, the high-speed operation performance of the solid-state imaging device is degraded.

Accordingly, it is desirable to provide a solid-state imaging device capable of operating at a high speed by reducing the substantial length of each column signal line from pixels to A/D converting units.

According to an embodiment of the invention, there is provided a solid-state imaging device including: a plurality of pixels each converting the amount of incident light into an electric signal and disposed in a plurality of columns to be deviated from the neighboring pixels in a row direction or in a column direction; a plurality of analog-to-digital converting units each converting an analog signal obtained from a corresponding pixel into a digital signal and disposed along a column in parallel; a plurality of column signal lines outputting the analog signals of the pixels of each of the plurality of pixel columns, disposed along the pixel columns, and making pairs; and a plurality of switching circuit units each selecting one column signal line of a corresponding pair of column signal lines. In the solid-state imaging device, the analog-to-digital converting units are connected to the output sides of the switching circuit units.

In the solid-state imaging device according to the embodiment of the invention, in order to output analog signals of a plurality of pixel columns, the column signal lines arranged along the individual pixel columns make pairs, the switching circuit units are provided for every pair to select one of the column signal lines of the corresponding pair, and the analog-to-digital converting units are connected to the output sides of the switching circuit units. Therefore, the total number of analog-to-digital converting units becomes half the total number of pixel columns, and at the same time, due to the switching circuit units, the number of column signal lines connected to each analog-to-digital converting unit becomes half that in the related art. As a result, the substantial length of the column signal line from each pixel to the analog-to-digital converting unit corresponding thereto becomes shorter.

According to the solid-state imaging device according to the embodiment of the invention, the switching circuit units are provided to select one of two column signal lines of each pair and the analog-to-digital converting units are provided to correspond one-to-one with the outputs of the switching circuit units. Therefore, it is possible to reduce the time it takes to read signals of the pixels to the column signal lines, as compared to the related art. As a result, the solid-state imaging device can operate at a higher speed.

DESCRIPTION OF THE PREFERRED EMBODIMENTS

Figure 1:
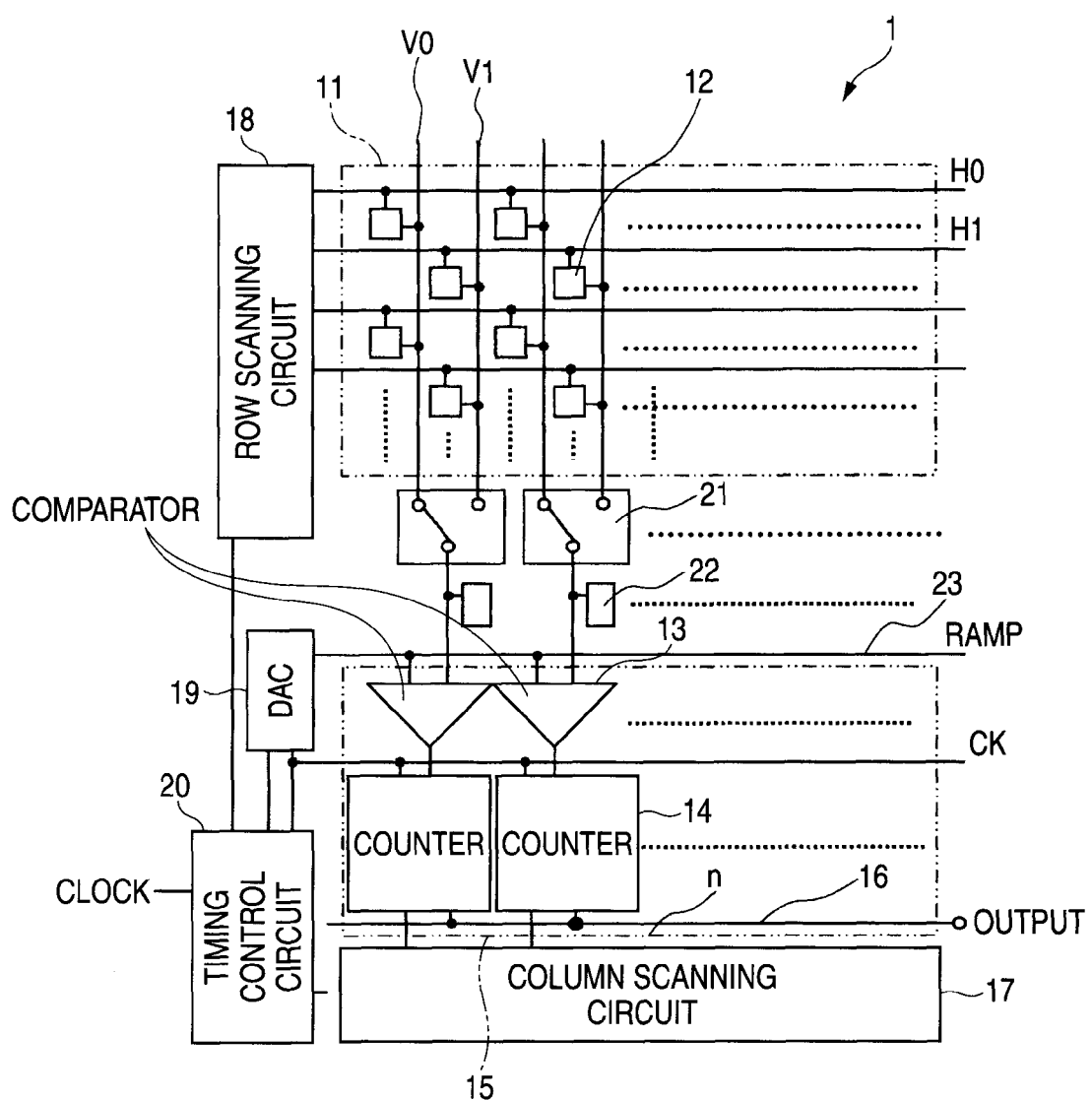
FIG. 1 is a block diagram illustrating an embodiment (first embodiment) of the invention.

An embodiment (first embodiment) of the invention will be described with reference to a block diagram of FIG. 1. FIG. 1 shows a MOS-type solid-state imaging device including a plurality of photoelectric conversion elements that are arranged to be staggered, and a plurality of analog-to-digital converters.

As shown in FIG. 1, a solid-state imaging device 1 includes a plurality of photoelectric conversion elements and a plurality of pixels 12 each having an amplifier. The pixels 12 are disposed in a matrix, that is, are arranged to be staggered so as to form a pixel array 11. Each of the photoelectric conversion elements is composed of, for example, a photodiode. 'A plurality of photoelectric conversion elements are disposed to be staggered' means that photoelectric conversion elements constituting an even-numbered photoelectric conversion element column deviate from photoelectric conversion elements constituting an odd-numbered photoelectric conversion element column by half a pitch P1 between two neighboring photoelectric conversion elements in each photoelectric conversion element column in a column direction and photoelectric conversion elements constituting an even-numbered photoelectric conversion element row deviate from photoelectric conversion elements constituting an odd-numbered photoelectric conversion element row by half the pitch P2 between two neighboring photoelectric conversion elements in each photoelectric conversion element row in a row direction such that each photoelectric conversion element row includes only photoelectric conversion elements in either even-numbered columns or odd-numbered columns.

When two neighboring pixels are arranged in zigzag as described above, since it is possible to reduce the pitch between the pixels, it is possible to increase an apparent resolution in the row direction (horizontal direction) and an apparent resolution in the column direction (vertical direction). However, in a CMOS image sensor, the smaller the pitch between pixels becomes, the more difficult it is to dispose circuits.

For this reason, in this invention, a plurality of column signal lines to which analog signals obtained from the pixels 12 are output make pairs, and a plurality of switching circuit units 21 for selecting one of two column signal lines of each of the pairs are connected. That is, one switching circuit unit 21 is provided for each pair of column signal lines. An output of each switching circuit unit 21 is connected to a current source 22 and a comparator 13 provided in the analog-digital converter. The plurality of analog-to-digital converters are disposed and constitute a column-parallel ADC block 15. Here, ADC is short for analog-to-digital converter.

Each of the analog-to-digital converters of the column-parallel ADC block 15 is composed of one comparator 13 and a counter 14 for counting comparison time and has an n-bit digital signal conversion function (n is a natural number). The comparators 13 compare a signal RAMP, which is generated by a digital-to-analog converter 19 (hereinafter, abbreviated as DAC) and is input through a reference line 23, with analog signals obtained from the pixels 12 in row signal lines H0, H1, . . . through column signal lines V0, V1, . . . .

A horizontal output line 16 includes horizontal output lines of an n-bit width, and n sensor circuits and n output circuits corresponding to the horizontal output lines.

Further, a timing control circuit 20 for generating an internal clock, a row scanning circuit 18 for controlling row addressing or row scanning, and a column scanning circuit 17 for controlling column addressing or column scanning are disposed to function as a control circuit for sequentially reading signals of the pixel array 11.

The counter 14 can be provided as a separate counter in order to read a reset component and a signal component from the pixels 12 twice and compute the read results. Also, in order to maintain a simplified structure, it is preferable to use an up-down counter configuration. It is more preferable that a memory unit for storing the count result be provided such that an output operation and a comparison/count operation by the column-parallel ADC block 15 can be performed in parallel.

In this embodiment, the number of horizontal output lines 16, the number of sensor circuits, and the number of output circuits are each n. However, it is possible to parallelize n×m (m is a natural number) horizontal output lines, n×m sensor circuits, and n×m output circuits so as to increase the output speed thereof. In some cases, n×m horizontal output lines 16, n×m sensor circuits, and n×l output circuits may be used (m×l and l is a natural number), and parallel-to-serial converter circuits or serial-to-parallel converter circuits may be disposed between the sensor circuits and the output circuits.

Figure 2:
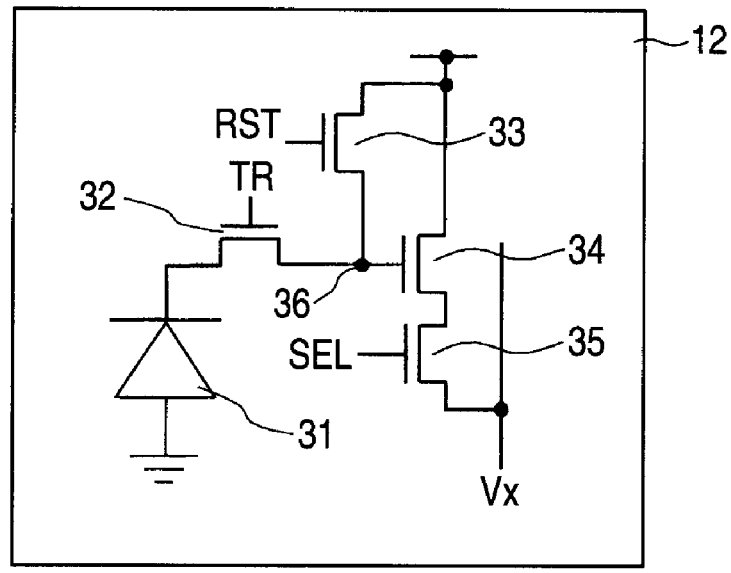
FIG. 2 is a circuit diagram illustrating an example of the circuit configuration of a pixel.

FIG. 2 shows an example of the circuit configuration of each pixel 12. One pixel (unit pixel) 12 includes a photodiode 31, a transfer transistor 32 for transferring charge of the photodiode 31 to a floating diffusion layer 36, an amplifying transistor 34 that performs signal amplification by source follower reading the charge of the floating diffusion layer 36 in cooperation with a current source provided at a terminal Vx, a reset transistor 33 for resetting the charge of, for example, the floating diffusion layer 36, and a selection transistor 35 for reading a signal and outputting the read signal to the terminal Vx. In this configuration example, all the transistors are N-channel transistors. However, even though some of or all of the transistors may be P-channel transistors, the same configuration is obtained. Additionally, the transfer transistor 32 may be omitted. Further, it is possible to omit the selection transistor 35 and perform selection control by means of a power supply. Furthermore, a plurality of unit pixels may share arbitrary components.

Figure 3:
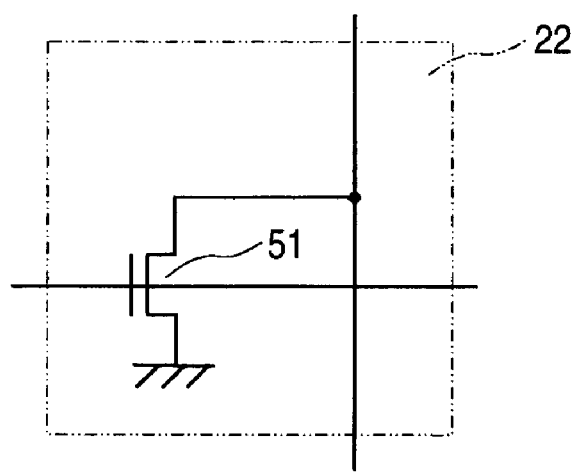
FIG. 3 is a circuit diagram illustrating an example of the circuit configuration of a current source.

FIG. 3 shows an example of the circuit configuration of a current source 22. The current source 22 is composed of an N-channel transistor 51 operating as a constant current source. The source of the N-channel transistor 51 is grounded, the drain thereof is connected to an output of a switching circuit 21, and the gate thereof is arbitrarily biased. In this configuration example, the current source is composed of one N-channel transistor. However, the configuration of the current source is not limited thereto. The current source may be composed of any circuit capable of stably operating as a constant current source. For example, in order to improve operational stability, the current source can be composed of cascaded transistors.

Figure 4:
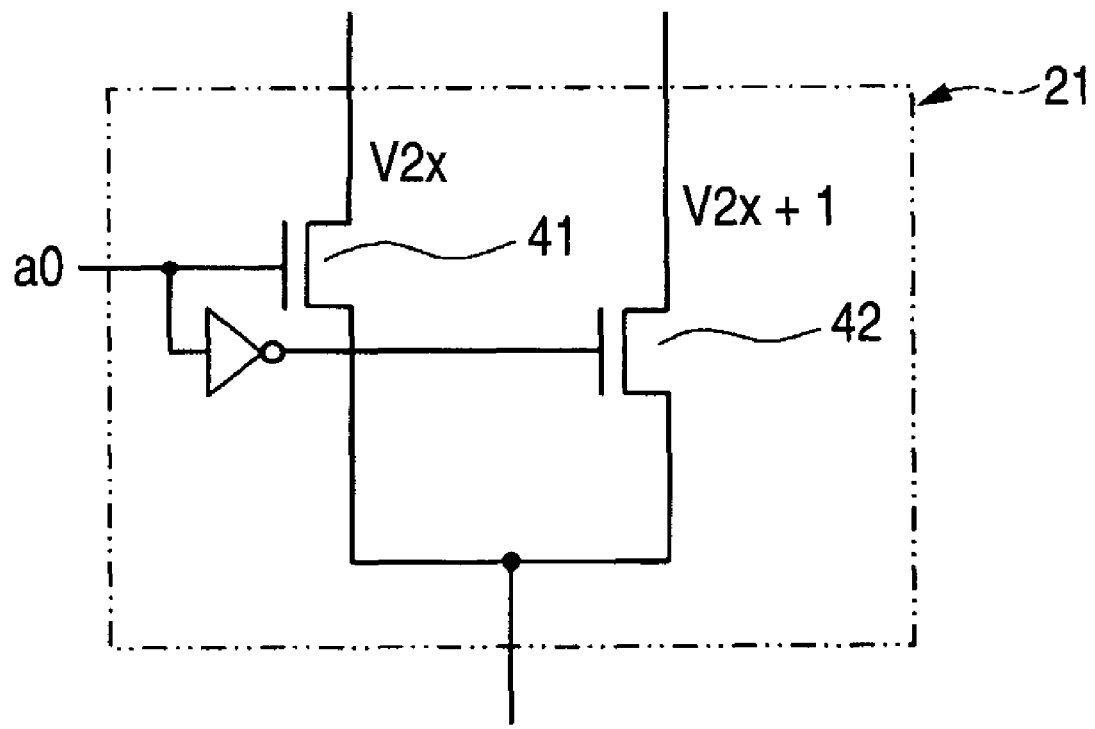
FIG. 4 is a circuit diagram illustrating an example of the circuit configuration of a switching circuit unit.

FIG. 4 shows an example of the circuit configuration of one switching circuit unit 21. Each of the switching circuit units 21 is composed of switching N-channel transistors 41 and 42 and an inverter. The switching N-channel transistor 41 has a drain connected to a column signal line V2x (x is 0 or a natural number), a gate to which a switching control signal a0 is input, and a source, and the switching N-channel transistor 42 has a drain connected to a column signal line V2x+1 (x is 0 or a natural number), a gate to which an inversion signal to which the switching control signal a0 is inverted by the inverter is input, and a source. The sources of the switching N-channel transistors 41 and 42 are connected to the current source 22 (see FIG. 1) and a comparator 13 of the column-parallel ADC block 15 (see FIG. 1) as common output. When the switching control signal a0 (for example, an address signal) is directly input to the switching circuit unit 21, in correspondence to the switching control signal a0, the switching N-channel transistors 41 and 42 are each turned on or off, so that the switching circuit unit 21 is switched. Since the inverter is provided, in correspondence to one control signal, necessarily, one of the switching N-channel transistors 41 and 42 is turned on and the other one is turned off. More specifically, according to a control signal, it is necessary that the switching N-channel transistor 41 is turned on and the switching N-channel transistor 42 is turned off, or the switching N-channel transistor 41 is turned off and the switching N-channel transistor 42 is turned on.

That is, the switching circuit unit 21 needs to be configured such that a signal from only one of the column signal lines V2x and V2x+1 of read pixels corresponding to a selected pixel row is output, and thus the circuit configuration is not limited to the above-mentioned configuration. For example, the switching circuit unit 21 may include P-channel transistors or an N-channel transistor and a P-channel transistor that are connected in parallel to complementarily operate, other than N-channel transistors.

Figure 5:
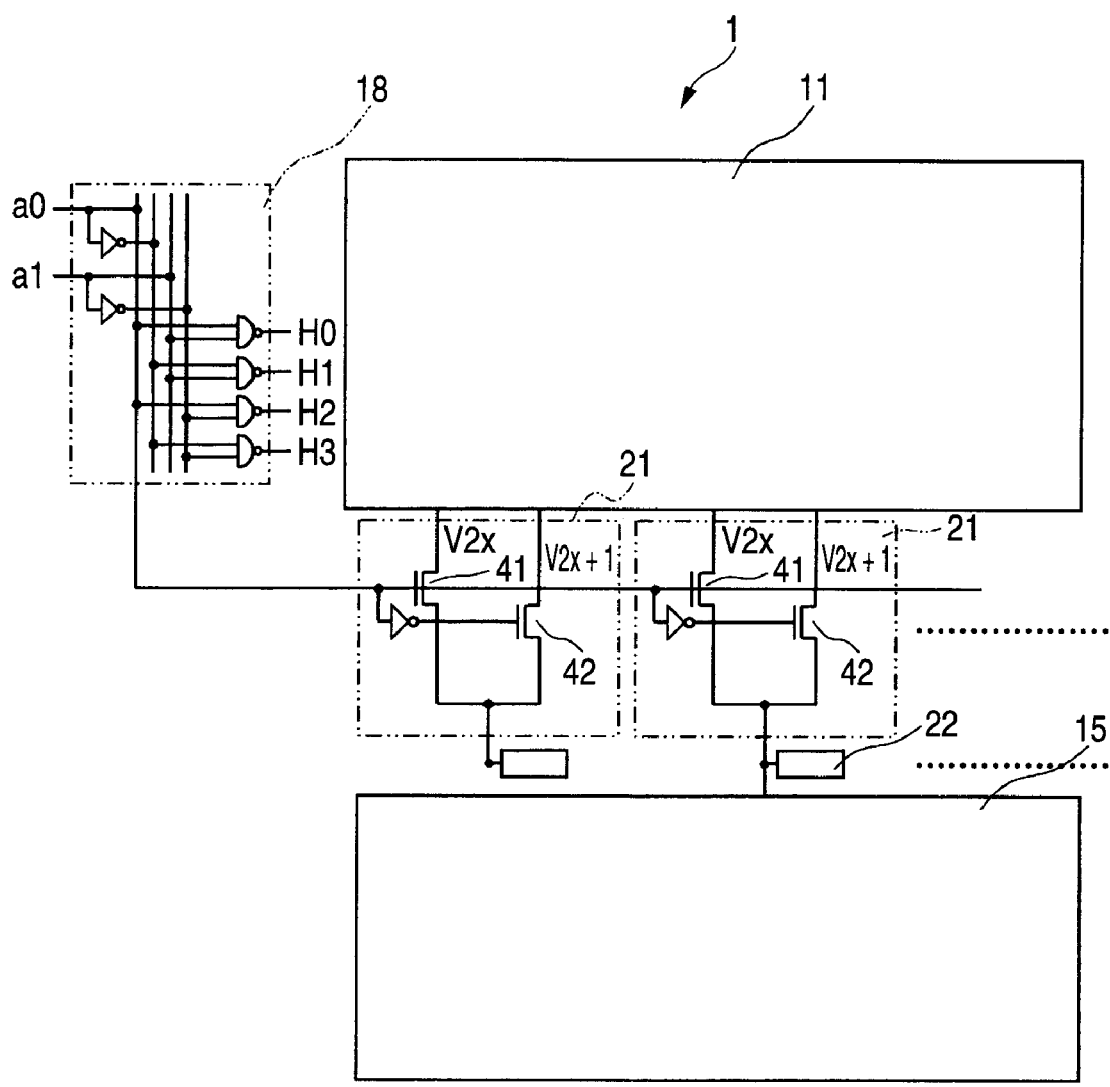
FIG. 5 is a block diagram for explaining the operation of the first embodiment.

FIG. 5 shows an example of the circuit configuration when the least significant bit of a row address signal before address decoding is set as the switching control signal for the switching circuit unit 21. In FIG. 5, only main parts taken from FIG. 1 are shown.

As shown in FIG. 5, when the least significant bit of row address signals a0, a1, . . . before address decoding, which is supplied to row address decoding circuits included in the row scanning circuit 18, is used the switching control signal for the switching circuit unit 21, the column signal lines V2x or V2x+1 corresponding to a selected row signal line (any one of row signal lines H0, H1, H2, and H3) is selected, and thus it is not necessary to provide a separate switching control signal.

In the solid-state imaging device 1 according to the first embodiment, the column signal lines which are for outputting analog signals of the plurality of pixel columns and are disposed along the individual pixel columns, make pairs, one switching circuit unit 21 for selecting one column signal line of two column signal lines V2x and V2x+1 making one pair is provided, and the analog-to-digital converting units of the column-parallel ADC block 15 are connected to the outputs of the switching circuit units 21 to correspond one-to-one with the switching circuit units 21. Therefore, the total number of analog-to-digital converting units is reduced to half the number of pixel columns, and at the same time, due to the switching circuit units 21, the number of column signal lines connected to the analog-to-digital converting units is reduced to half that in the related art. As a result, it is possible to reduce the length of the substantial column signal line from each pixel 12 to the analog-to-digital converting unit of the column-parallel ADC block 15. In this way, the problem of the wiring length being increased due to the column signal lines V0, V1, . . . disposed along the sides of pixel columns in the staggered arrangement is solved. Therefore, since the time it takes to read signals of the unit pixels 12 to the column signal lines V0, V1, . . . is reduced, the solid-state imaging device 1 has an advantage in that it operates at a high speed. Also, since column circuits, that is, the analog-to-digital converting units of the column-parallel ADC block 15 can be disposed at a pitch two times as large as that between the pixels 12, the layout thereof becomes simpler. Further, since the number of analog-to-digital converting units is reduced by half than in the related art, it is possible to reduce the circuit area.

The operation of the MOS-type solid-state imaging device according to this embodiment will now be described with reference to block diagrams of FIGS. 1 and 5 and circuit diagrams of FIGS. 2 to 4.

When an even-numbered row signal line H2$x$ (x is 0 or a natural number) is selected, signals are output from the unit pixels 12 to the even-numbered row signal line V2$x$ (x is 0 or a natural number). At this time, on the basis of the switching control signal a0, the switching circuit units 21 select the even-numbered column signal lines V0, V2, . . . such that the signals are output from the even-numbered column signal lines and disconnect the odd-numbered column signal lines V1, V3, . . . . Similarly, when an odd-numbered signal line H2$x$+1 (x is 0 or a natural number) is selected, signals are output from the unit pixels 12 to the odd-numbered column signal lines V2$x$+1 (x is 0 or a natural number). At this time, on the basis of the switching control signal a0, the switching circuit units 21 select the odd-numbered column signal lines V1, V3, . . . such that the signals are output from the odd-numbered column signal lines and disconnect the even-numbered column signal lines V0, V2, . . . . In this embodiment, the even-numbered row signal lines correspond to the even-numbered column signal lines and the odd-numbered row signal lines correspond to the odd-numbered column signal lines. Even when the even-numbered row signal lines correspond to the odd-numbered column signal lines and the odd-numbered row signal lines correspond to the even-numbered column signal lines, it is possible to simply cope with that situation by only changing the switching control logic.

In the above-mentioned operation, only the column signal lines corresponding to the selected row signal lines are connected to the outputs and the column signal lines corresponding to the non-selected row signal lines are disconnected from the outputs by the switching circuit unit 21, and then the signals of the unit pixels 12 are read. Therefore, the load capacity of the wiring lines or the elements during the reading of the signals is reduced by about half than the examples of the related art. As a result, it is possible to reduce the amount of time it takes to read the signals.

Figure 6:
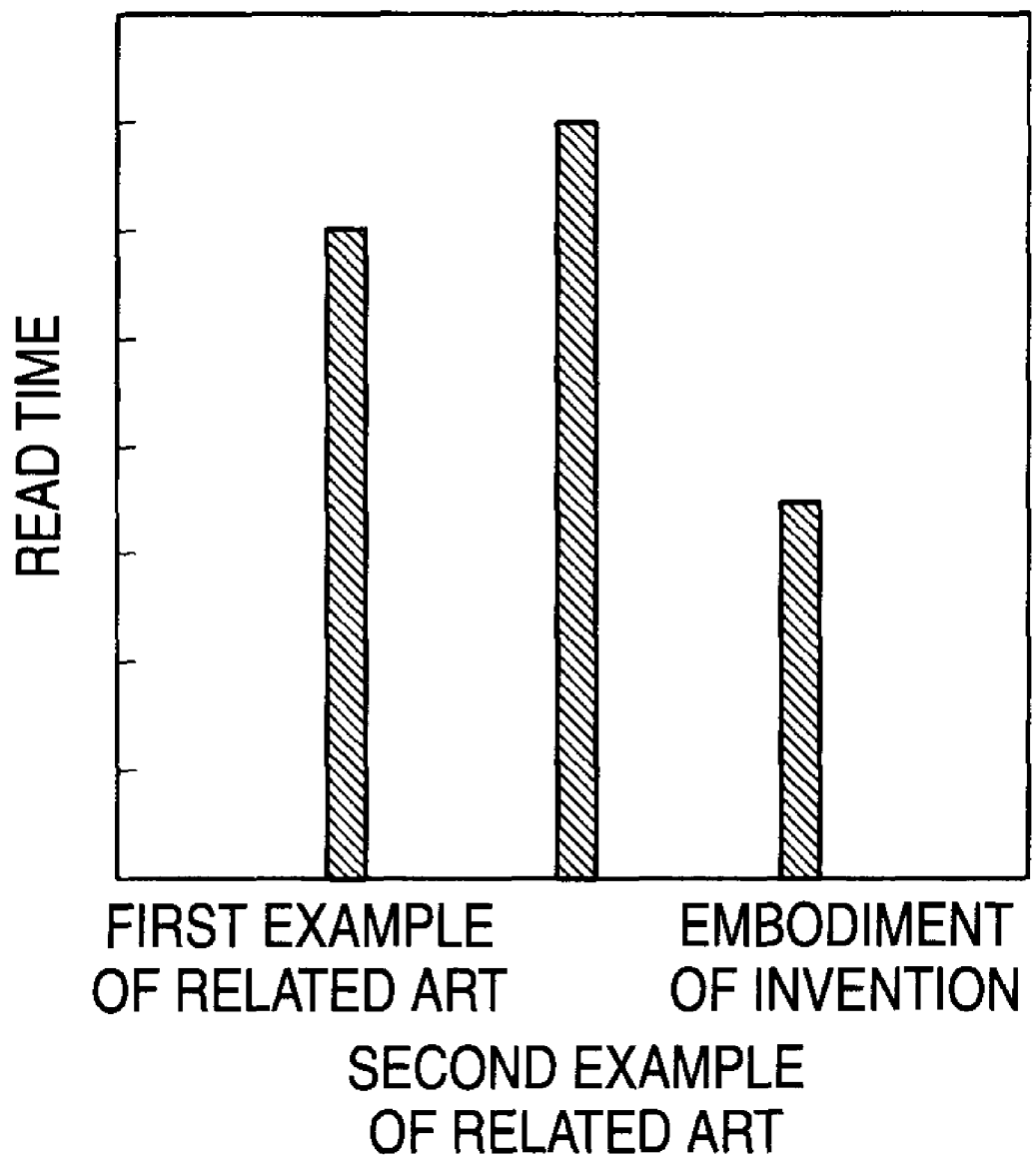
FIG. 6 is a graph exhibiting effects regarding read time according to an embodiment of the invention.

FIG. 6 shows a circuit simulation result representing the effects according to an embodiment of the invention. More specifically, FIG. 6 is a graph showing a result of a circuit simulation in which, when the signals of the unit pixels 12 are read to the column signal lines, the time it takes for the reading to be stabilized is measured. The read time represented by a vertical axis in FIG. 6 is determined by various parameters, such as the lengths of the signal lines, the thickness of the signal lines, characteristics of the signal lines, the number of elements, the sizes of the elements, and a read current. In this graph, the read time is a relative value under an arbitrary condition and is expressed in arbitrary units. According to this graph, it can be seen that the read time in the solid-state imaging device according to the embodiment of the invention is reduced almost by half as compared to the first and second comparison examples of the related art. When the amount of time it takes to read the signals of the unit pixels to the column signal lines can be reduced, the solid-state imaging device can operate at a higher speed. Therefore, increase of the operational speed of the invention is possible.

Figure 7:
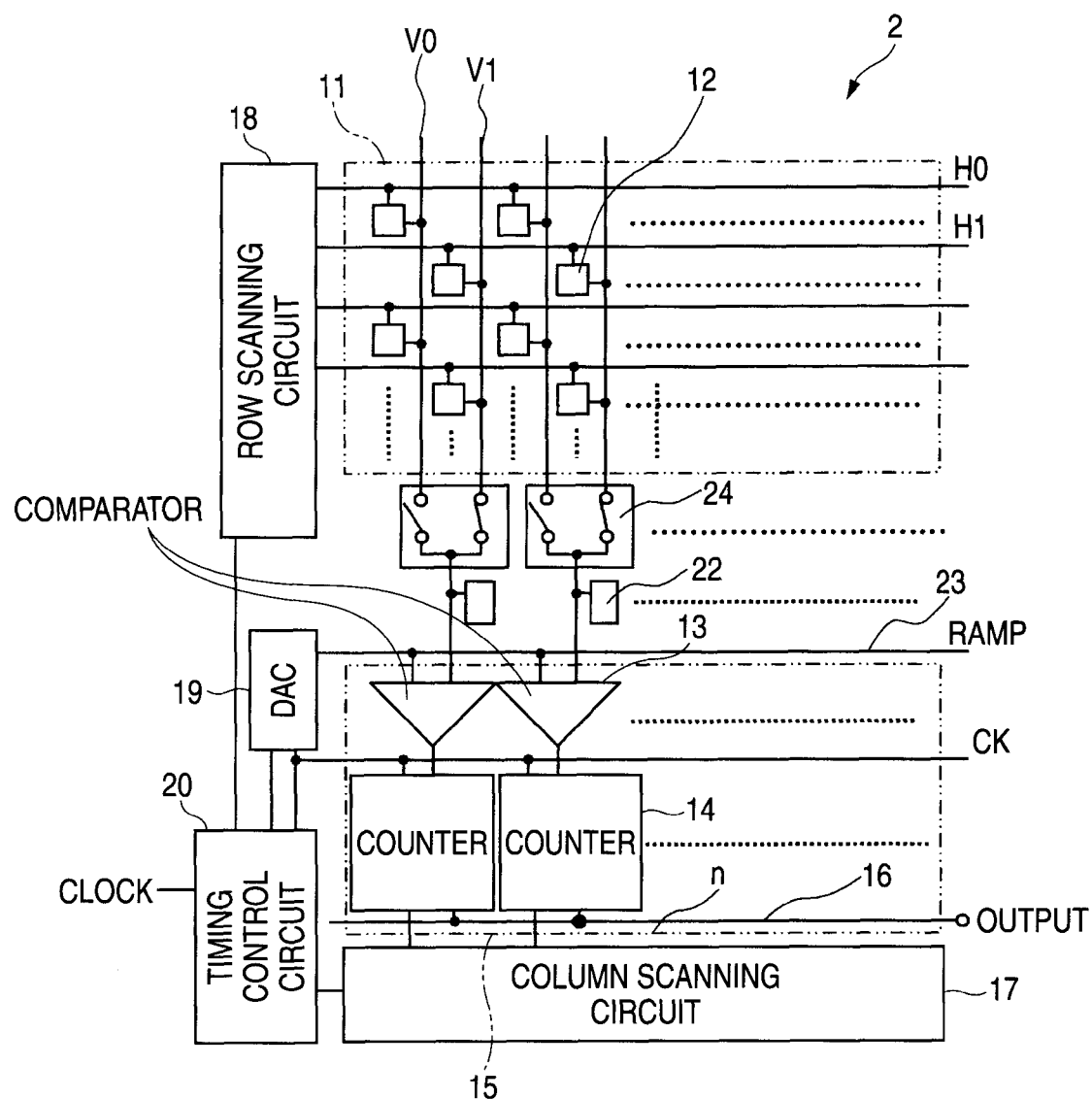
FIG. 7 is a block diagram illustrating another embodiment (second embodiment) of the invention.

FIG. 7 is a block diagram illustrating a MOS-type solid-state imaging device according to a second embodiment of the invention which includes a plurality of photoelectric conversion elements disposed to be staggered and a plurality of analog-to-digital converting units (hereinafter, referred to as ADCs) and from which an analog signal is output.

As shown in FIG. 7, a solid-state imaging device 2 according to the second embodiment has the same structure as the solid-state imaging device 1 according to the first embodiment except for the internal configuration of a switching circuit unit 24. That is, the solid-state imaging device 2 has a plurality of pixels 12 each including a photoelectric conversion element and an amplifier formed therein. The pixels 12 are disposed in a matrix, more particularly, disposed to be staggered so as to form a pixel array 11.

A plurality of column signal lines to which analog signals obtained from the pixels 12 are output make pairs and the switching circuit unit 24 is provided for each pair to select one of two column signal lines making the corresponding pair. That is, one switching circuit unit 24 is provided for every two column signal lines. The output of each switching circuit unit 24 is connected to a comparator 13 provided in an analog-to-digital converting unit and a current source 22. The plurality of analog-to-digital converting units form a column-parallel ADC block 15.

Each of the analog-to-digital converters of the column-parallel ADC block 15 is composed of one comparator 13 and a counter 14 for counting comparison time and has an n-bit digital signal conversion function (n is a natural number). The comparators 13 compare a signal RAMP, which is generated by a digital-to-analog converter 19 (hereinafter, abbreviated as DAC) and is input through a reference line 23, with analog signals obtained from the pixels 12 in row signal lines H0, H1, . . . through column signal lines V0, V1 . . . .

A horizontal output line 16 includes horizontal output lines of an n-bit width, and n sensor circuits and n output circuits corresponding to the horizontal output lines.

Further, a timing control circuit 20 for generating an internal clock, a row scanning circuit 18 for controlling row addressing or row scanning, and a column scanning circuit 17 for controlling column addressing or column scanning are disposed as a control circuit for sequentially reading signals of the pixel array 11.

The counter 14 can be provided as a separate counter in order to read a reset component and a signal component from the pixels 12 twice and compute the read results. Also, in order to maintain a simplified structure, it is preferable to use an up-down counter configuration. It is more preferable that a memory unit for storing the count result be provided such that an output operation and a comparison/count operation by the column-parallel ADC block 15 can be performed in parallel.

In this embodiment, the number of horizontal output lines 16, the number of sensor circuits, and the number of output circuits each are n. However, it is possible to parallelize n×m (m is a natural number) horizontal output lines, n×m sensor circuits, and n×m output circuits so as to increase the output speed thereof. In some cases, n×m horizontal output lines 16, n×m sensor circuits, and n×l output circuits may be used (m×l and l is a natural number), and parallel-to-serial converter circuits or serial-to-parallel converter circuits may be disposed between the sensor circuits and the output circuits.

Figure 8:
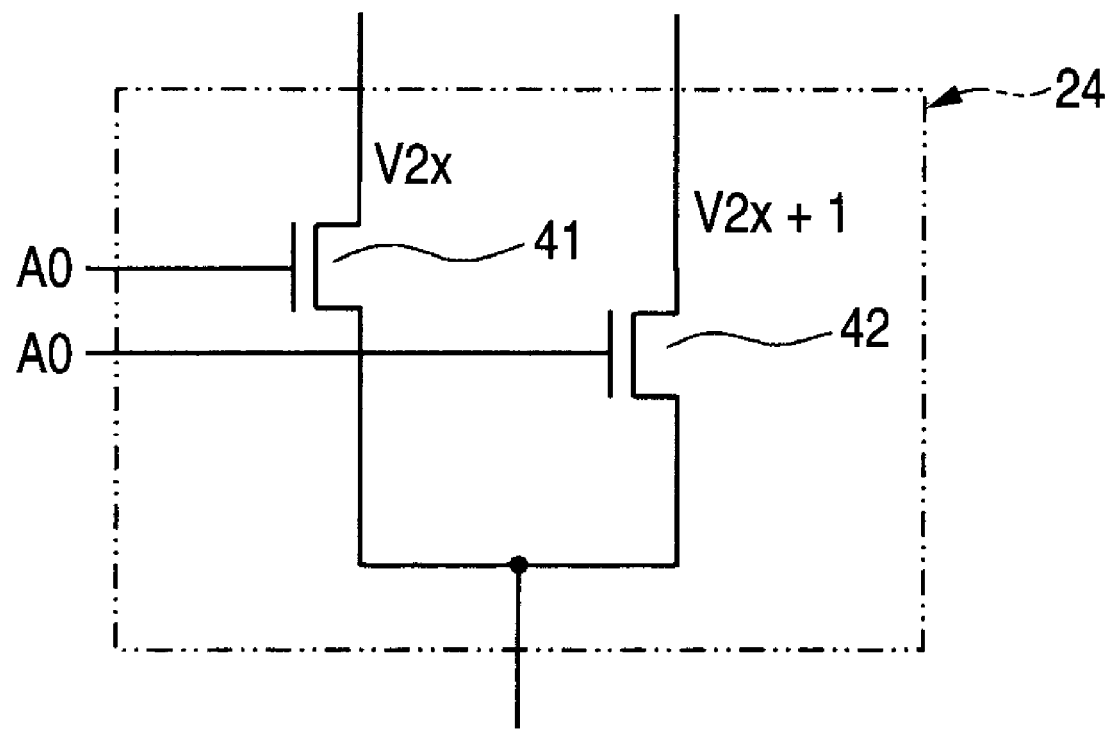
FIG. 8 is a circuit diagram illustrating an example of the circuit configuration of a switching circuit unit.

FIG. 8 is a circuit diagram illustrating an example of the configuration of the switching circuit unit 24 in the solid-state imaging device 2 according to the second embodiment.

As shown in FIG. 8, the basic configuration, operation, and effect of the switching circuit unit 24 are the same as the switching circuit unit 21 of the first embodiment except that the switching circuit unit 24 has a configuration simpler than that of the switching circuit unit 21 of the first embodiment shown in FIG. 4 and the complementary control of a switching control signal is performed outside the switching circuit 24.

That is, each of the switching circuit units 24 is composed of switching N-channel transistors 41 and 42. The switching N-channel transistor 41 has a drain connected to a column signal line V2x (x is 0 or a natural number), a gate to which a switching control signal a0 is input, and a source, and the switching N-channel transistor 42 has a drain connected to a column signal line V2x+1 (x is 0 or a natural number), a gate to which an inversion signal of the switching control signal a0 is input, and a source. The sources of the switching N-channel transistors 41 and 42 are connected to a current source 22 (see FIG. 7) and a comparator 13 of the column-parallel ADC block 15 (see FIG. 7) as common output. When the switching control signal a0 (for example, an address signal) is directly input to the switching circuit unit 24, in correspondence to the switching control signal a0, the switching N-channel transistors 41 and 42 are each turned on or off, so that the switching circuit unit 24 is switched. In correspondence to one control signal, it is necessary that one of the switching N-channel transistors 41 and 42 be turned on and the other one be turned off. More specifically, according to a control signal, it is necessary that the switching N-channel transistor 41 be turned on and the switching N-channel transistor 42 be turned off, or the switching N-channel transistor 41 be turned off and the switching N-channel transistor 42 be turned on.

Figure 9:
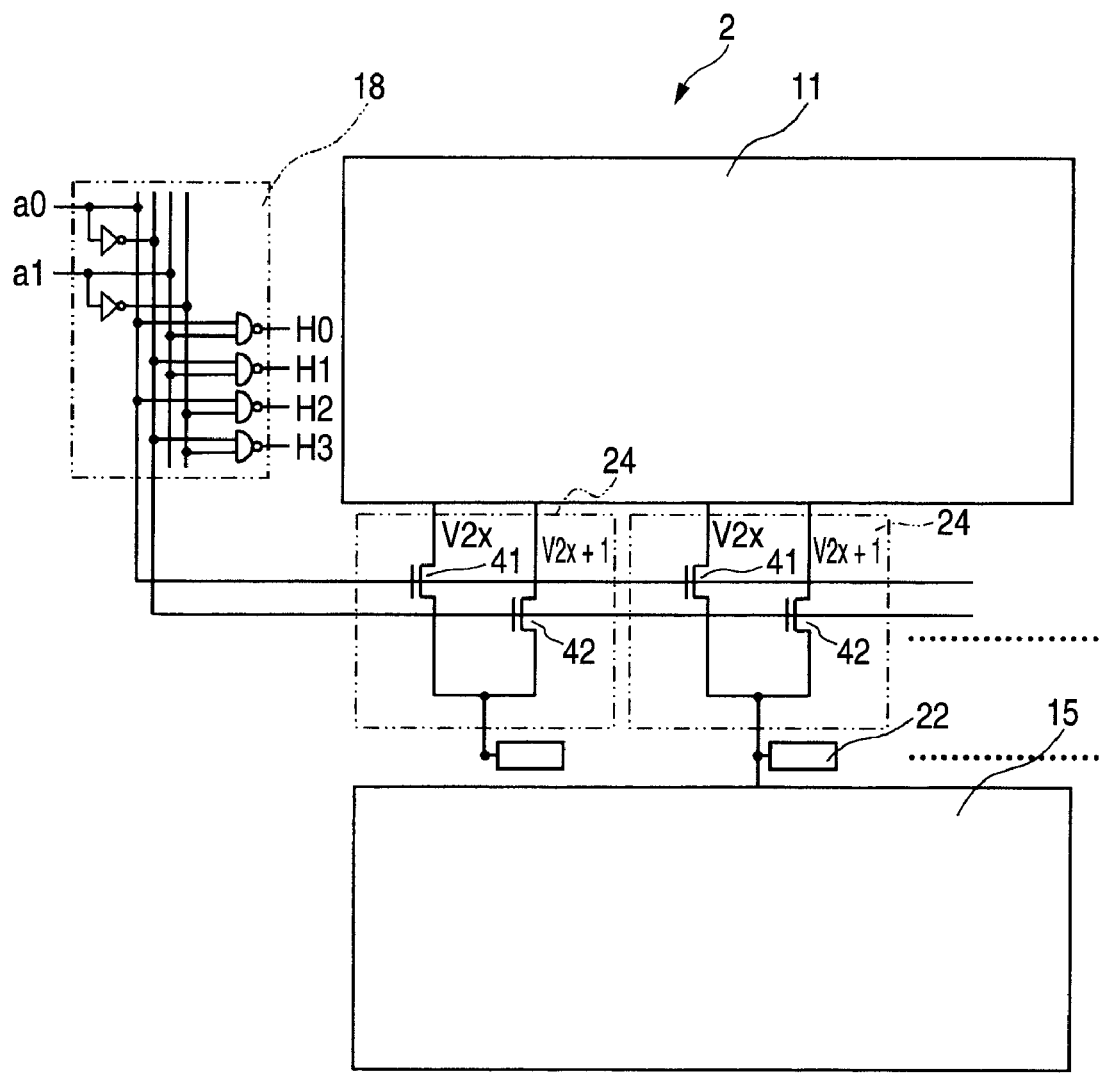
FIG. 9 is a block diagram for explaining the operation of the second embodiment.
Figure 10:
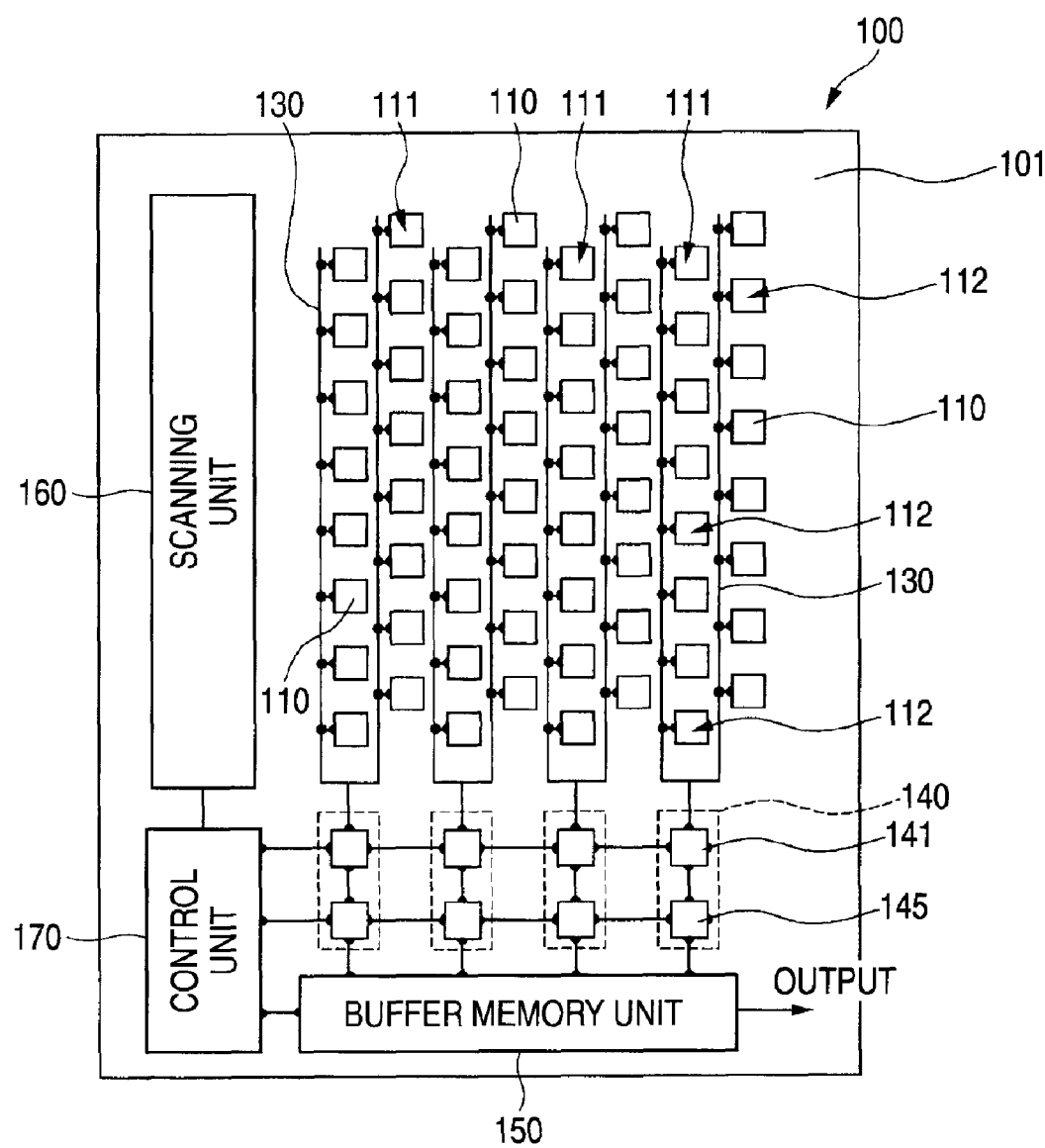
FIG. 10 is a block diagram illustrating a first example according to the related art.
Figure 11:
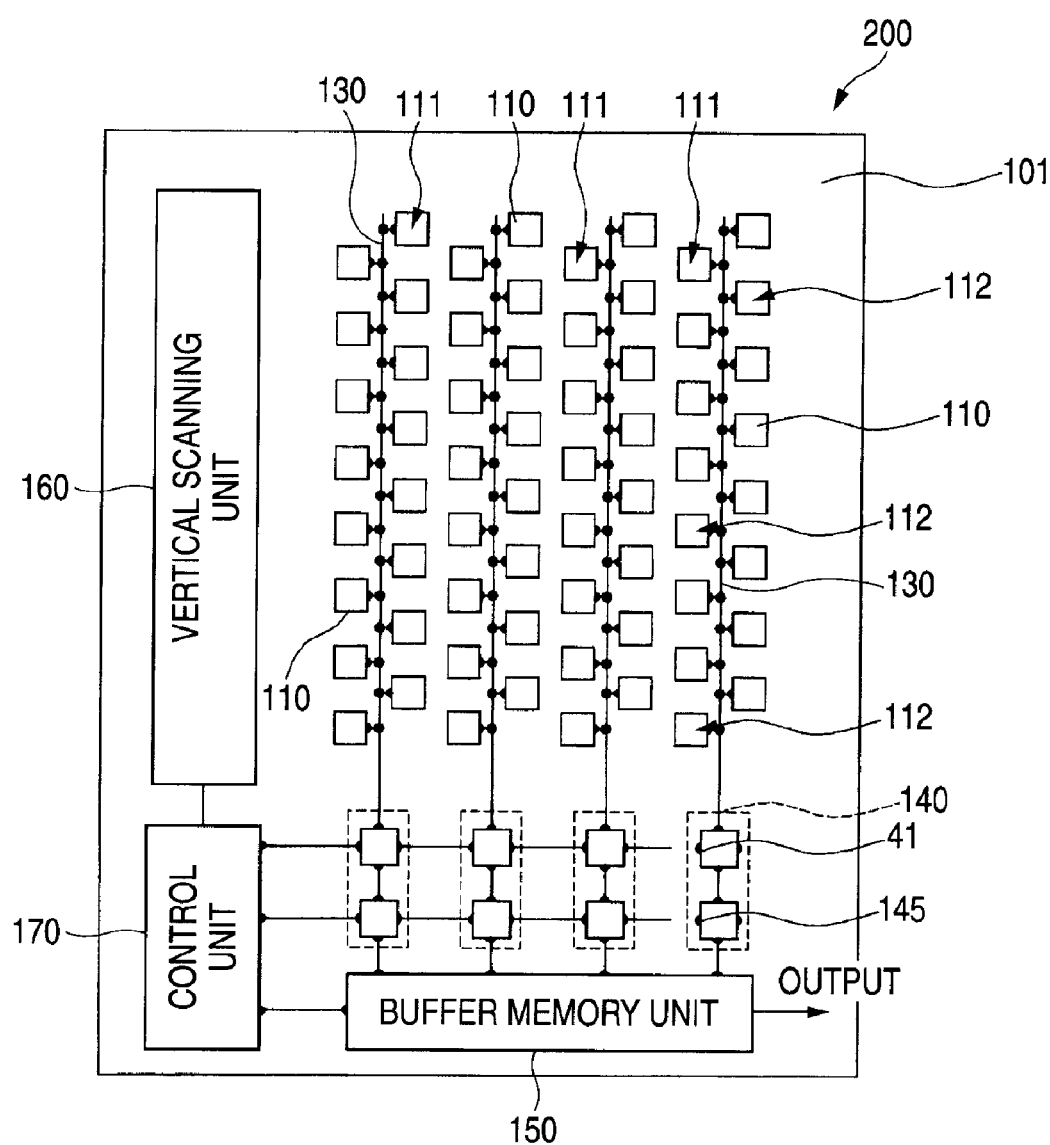
FIG. 11 is a block diagram illustrating a second example according to the related art.

FIG. 9 is a block diagram illustrating an example of the circuit configuration when the least significant bit of a row address signal before address decoding supplied to a row address decoding circuit is set as a switching control signal for the switching circuit unit 24. In FIG. 9, only main parts taken from FIG. 7 are shown.

As shown in FIG. 9, during address decoding, since an inversion signal of the row address signal is generated, the row address signal and the inversion signal thereof, serving as two control signals, separately control the N-channel transistor 41 and the N-channel transistor 42 such that one of the N-channel transistors 41 and 42 is turned on and the other one is turned off. More specifically, according to the row address signal and the inversion signal thereof, the N-channel transistor 41 is turned on and the N-channel transistor 42 is turned off, or the N-channel transistor 41 is turned off and the N-channel transistor 42 is turned on. Therefore, the switching circuit unit 24 does not need a circuit for complementarily controlling switching in the switching circuit unit 24 (the inverter in the first embodiment).

The solid-state imaging device 2 according to the second embodiment obtains the same effects as the solid-state imaging device 1 according to the first embodiment. Further, the basic configuration, operation, and effects of the switching circuit unit 24 are the same as the switching circuit unit 21 in the first embodiment except that the configuration of switching circuit unit 24 is simpler than the switching circuit unit 21.

Furthermore, since both the switching circuit units 21 and 24 according to the first and second embodiments use the least significant bit, in the circuit configuration, according to a selected row, necessary columns are automatically determined.

Figure 12:
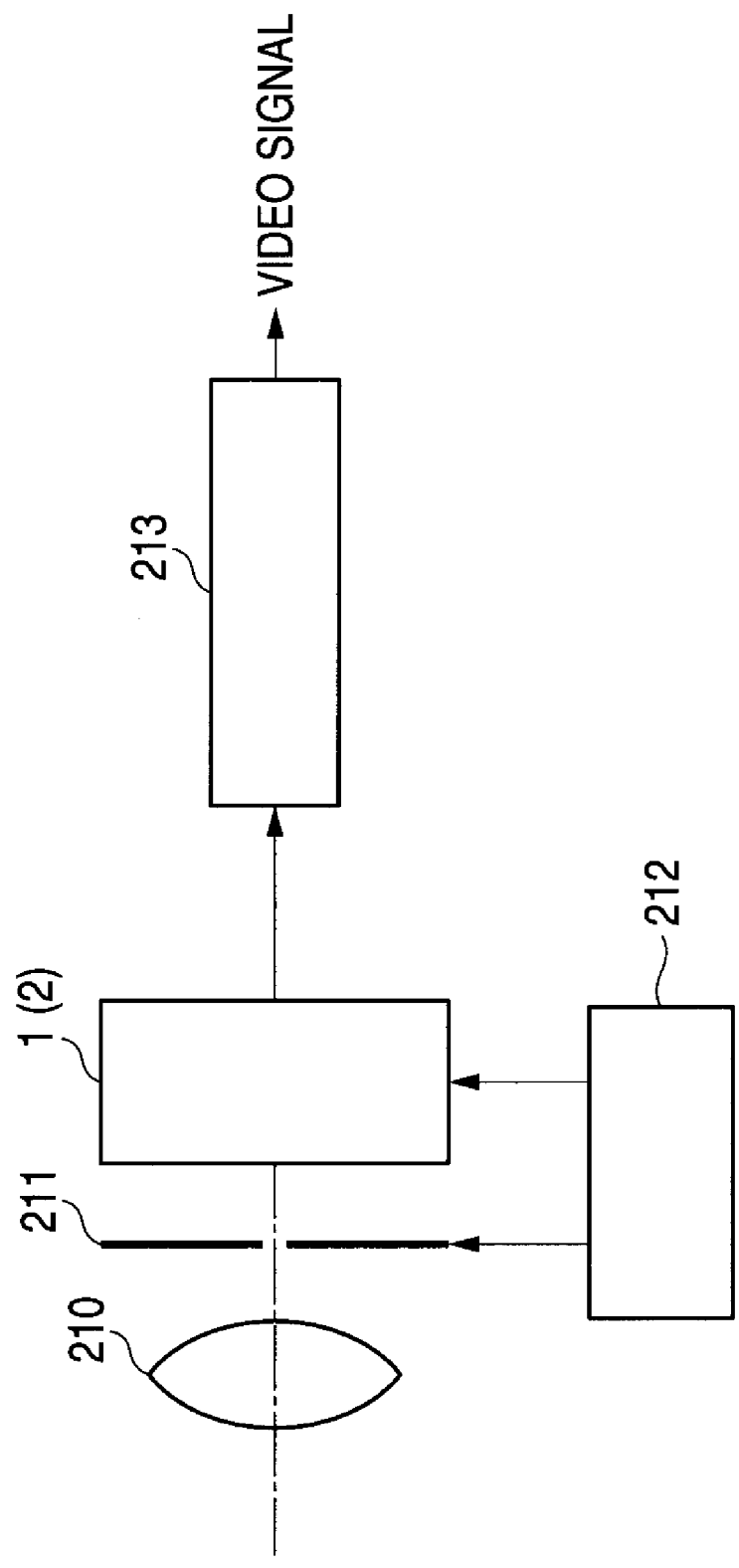
FIG. 12 is a cross-sectional view illustrating a camera according to a third embodiment of the invention.

FIG. 12 is a cross-sectional view illustrating a camera according to a third embodiment, which includes the solid-state imaging device according to the first or second embodiment. A camera according to the third embodiment is an example of video cameras capable of taking a video.

The camera according to this embodiment includes the solid-state imaging device 1 or 2, an optical system 210, a shutter device 211, a driving circuit 212, and a signal processing circuit 213.

The optical system 210 focuses image light (incident light) from a subject for photography onto the solid-state imaging device 1 or 2. As a result, during a predetermined period, a corresponding signal charge is stored in the solid-state imaging device 1 or 2.

The shutter device 211 controls a period for which the light is radiated onto the solid-state imaging device 1 or 2 and a period for which the solid-state imaging device is shielded from the light.

The driving circuit 212 supplies driving signals for controlling a transfer operation of the solid-state imaging device 1 or 2 and a shutter operation of the shutter device 211. According to the driving signals (timing signals) supplied from the driving circuit 212, the solid-state imaging device 1 or 2 performs charge transfer. The signal processing circuit 213 performs various signal processes. A video signal having being subjected to a signal process is stored in a storage medium, such as a memory, or is output to a monitor.

It should be understood by those skilled in the art that various modifications, combinations, sub-combinations, and alterations may occur depending on design requirements and other factors insofar as they are within the scope of the appended claims or the equivalents thereof.

What is claimed is:

1. A solid-state imaging device comprising:
    a plurality of pixels units, each of which converts an amount of incident light into an electric analog signal, and which are disposed in a plurality of columns so as to be staggered relative to and to deviate from adjacent pixels in a row direction or in a column direction;
    a plurality of analog-to-digital converting units, each of which converts an electric analog signal into a digital signal, and which are disposed along ends of said columns;
    a plurality of column signal lines associated with each of the plurality of pixel columns via which the electric analog signals of the pixel units of each of the plurality of pixel columns are output, and which are disposed along the pixel columns, and which are arranged in pairs;
    a plurality of switching circuit units coupled between said analog-to-digital converting units and said column signal lines, each switching unit selectively connecting one column signal line of a corresponding pair of column signal lines to a corresponding one of said analog-to-digital converting units, and each of which has an output side;
    a row scanning circuit that controls row addressing and row scanning of said pixel units so as to enable output of said electric analog signals from said pixel units onto said column signal lines; and
    a column scanning circuit that controls column addressing and column scanning of said pixel units so as to enable reading of said electric analog signals from said pixel units,
    wherein,
    the row scanning circuit is supplied with digital row address signals, and only the least significant bit of the row address signals is supplied to the row scanning circuit, before decoding of same, is used as a switching control signal for the switching circuit units.

2. The solid-state imaging device according to claim 1, wherein each of the switching circuit units selects one column signal line of a corresponding pair of column signal lines and does not select the other column signal line.

3. The solid-state imaging device according to claim 1, further comprising:
a plurality of current source circuits corresponding to signal lines connected to the switching circuit units and the analog-to-digital converting units corresponding to the switching circuit units.

4. A solid-state imaging device comprising:
a plurality of pixels units, each of which converts an amount of incident light into an electric analog signal, and which are disposed in a plurality of columns so as to be staggered relative to and to deviate from adjacent pixels in a row direction or in a column direction;
a plurality of analog-to-digital converting units, each of which converts an electric analog signal into a digital signal, and which are disposed along ends of said columns;
a plurality of column signal lines associated with each of the plurality of pixel columns via which the electric analog signals of the pixel units of each of the plurality of pixel columns are output, and which are disposed along the pixel columns, and which are arranged in pairs;
a plurality of switching circuit units coupled between said analog-to-digital converting units and said column signal lines, each switching unit selectively connecting one column signal line of a corresponding pair of column signal lines to a corresponding one of said analog-to-digital converting units, and each of which has an output side;
a row scanning circuit that controls row addressing and row scanning of said pixel units so as to enable output of said electric analog signals from said pixel units onto said column signal lines; and
a column scanning circuit that controls column addressing and column scanning of said pixel units so as to enable reading of said electric analog signals from said pixel units
wherein,
the row scanning circuit is supplied with digital row address signals, and
only the least significant bit of the row address signals, supplied to the row scanning circuit before decoding of same, is used as a switching control signal for one of the switching circuit units, and
an inversion signal of the least significant bit signal is used as a switching control signal for another switching circuit unit.

5. The solid-state imaging device according to claim 4, wherein the switching circuits selecting or not selecting the corresponding pair of column signal lines are alternately selected for the analog-to-digital converting unit corresponding to the switching circuit unit.

6. The solid-state imaging device according to claim 4, further comprising:
a plurality of current source circuits corresponding to signal lines connected to the switching circuit units and the analog-to-digital converting units corresponding to the switching circuit units.

7. A method of driving a solid-state imaging device which includes
(a) a plurality of pixels units, each of which converts an amount of incident light into an electric analog signal, and which are disposed in a plurality of columns so as to be staggered relative to and to deviate from adjacent pixels in a row direction or in a column direction,
(b) a plurality of analog-to-digital converting units, each of which converts an electric analog signal into a digital signal, and which are disposed along ends of said columns,
(c) a plurality of column signal lines associated with each of the plurality of pixel columns via which the electric analog signals of the pixel units of each of the plurality of pixel columns are output, and which are disposed along the pixel columns, and which are arranged in pairs,
(d) a plurality of switching circuit units coupled between said analog-to-digital converting units and said column signal lines, each switching unit selectively connecting one column signal line of a corresponding pair of column signal lines to a corresponding one of said analog-to-digital converting units, and each of which has an output side;
(e) a row scanning circuit that controls row addressing and row scanning of said pixel units so as to enable output of said electric analog signals from said pixel units onto said column signal lines; and
(f) a column scanning circuit that controls column addressing and column scanning of said pixel units so as to enable reading of said electric analog signals from said pixel units,
said method comprising the steps of:
supplying the row scanning circuit with a digital row address signal;
supplying only the least significant bit signal of the row address signal, before decoding of same, to a switching circuit unit, and
controlling switching by the switching circuit unit with the least significant bit signal of the row address signal.

* * * * *